US012738420B2

(12) United States Patent
Stemmermann

(10) Patent No.: US 12,738,420 B2
(45) Date of Patent: Sep. 15, 2026

(54) CAPACITORS FROM MAGNETIC PARTICLES

(71) Applicant: SunRay Scientific, LLC, Eatontown, NJ (US)

(72) Inventor: Andrew Stemmermann, Long Branch, NJ (US)

(73) Assignee: SunRay Scientific, Inc., Wall, NJ (US)

(*) Notice: Subject to any disclaimer, the term of this patent is extended or adjusted under 35 U.S.C. 154(b) by 0 days.

(21) Appl. No.: 17/118,584

(22) Filed: Dec. 10, 2020

(65) Prior Publication Data

US 2021/0175015 A1 Jun. 10, 2021

Related U.S. Application Data

(60) Provisional application No. 62/946,425, filed on Dec. 10, 2019.

(51) Int. Cl.
*H01G 4/14* (2006.01)
*H01G 4/38* (2006.01)
*H01G 13/00* (2013.01)

(52) U.S. Cl.
CPC ............... *H01G 4/14* (2013.01); *H01G 4/385* (2013.01); *H01G 13/00* (2013.01)

(58) Field of Classification Search
CPC ................................ H01G 4/385; H01G 4/14
See application file for complete search history.

(56) References Cited

U.S. PATENT DOCUMENTS 2,892,139 A * 6/1959 Salzberg ................ H01G 4/206 361/312
3,535,602 A * 10/1970 Hrach .................. H01G 4/1209 361/312
6,906,909 B2 * 6/2005 Stauffer ................... H01G 4/20 361/321.1
2006/0065995 A1 * 3/2006 Masaki ................... H01L 24/83 264/439
2008/0151469 A1 * 6/2008 Thompson .............. H01L 28/60 361/303
2010/0214718 A1 * 8/2010 Yeh ......................... H01L 28/60 361/305
2010/0309605 A1 * 12/2010 Lin ..................... H01L 23/5223 361/306.3

(Continued)

FOREIGN PATENT DOCUMENTS

JP 2001185261 A * 7/2001 ............... H01F 1/28
JP 2010177571 A * 8/2010

OTHER PUBLICATIONS

Breval, E., Klimkiewicz, M., Shi, Y.T. et al. Magnetic alignment of particles in composite films. Journal of Materials Science 38, 1347-1351 (2003). https://doi.org/10.1023/A:1022867400786 (Year: 2003).*

*Primary Examiner* — David M Sinclair
(74) *Attorney, Agent, or Firm* — Capitol Patent & Trademark Law Firm, PLLC

(57) ABSTRACT

Compositions and methods for creating in situ capacitors, micro-capacitors, battery like applications, and chipless memory chips are provided. The methods and compositions all comprise the use of magnetically-alignable particles. In various applications herein the particles may be nonconductive, in another aspect, the particles are conductive. The functional capacitors entail the ferromagnetic particles and a dielectric material or a non-conductive coating.

6 Claims, 3 Drawing Sheets

(56) References Cited

U.S. PATENT DOCUMENTS

| | | | | |
|---|---|---|---|---|
| 2012/0032302 | A1* | 2/2012 | Smith | H01G 4/012<br>257/532 |
| 2015/0092317 | A1* | 4/2015 | Gabig | H01G 4/008<br>29/25.42 |

* cited by examiner

CAPACITORS FROM MAGNETIC PARTICLES

CROSS-REFERENCE TO RELATED APPLICATIONS

This claims benefit of U.S. Provisional Patent Application No. 62/946,425 filed Dec. 10, 2019, the entirety of which is incorporated herein by reference.

BACKGROUND

Field of the Invention

This relates generally to electrical components that are capacitors or which have capacitor-like functions. More particularly, this relates to compositions and methods for providing capacitors using magnetic particles.

Description of Related Art

Capacitors serve many functions in electrical and electronic systems including at least (temporary) energy storage, conditioning power, and providing power pulses. Capacitors can also be used helping to correct power factor. Other functions that can be provided by capacitors in various applications include oscillation, providing sensor functions, starting motors, filtering noise, signal coupling, decoupling portions of circuits (e.g. by-pass capacitors) and high- and low-pass filters. Structurally, prior art capacitors generally consist of electrodes separated by a dielectric, connecting leads, and housing. Failure of capacitors can often result from mechanical damage such as leads being broken or separated, shorts, leakage/parallel parasitic resistance, or even catastrophic or open failures. Other problems can result from problems with the dielectric material such as leaking or degradation/breakdown, migration of electrode materials through the dielectric to form conductive paths, and an increase of dissipation factor (or loss of quality factor) as a result of contamination with flux or solvent residues.

While many prior art capacitors use liquid dielectric materials, solid capacitors (aka solid aluminum electrolytic capacitors) are also known in the art. The prior art also provides polymer electrolytic capacitors comprising solid electrolyte of a conductive polymer.

There is a need for small scale and in situ created functional capacitors and such capacitors would have utility in modern electronics, including microelectronics.

SUMMARY

The inventor has surprisingly discovered methods and compositions that provide the ability to create interesting capacitors in situ using magnetically-alignable particles. The particles are on a scale of sub millimeter to nanometers in effective diameter. The particles have a ferromagnetic core that allows them to be manipulated in the presence of a magnetic field. In various applications, the particles can be highly conductive, or nonconductive depending on the additional components and specific applications. The particles can be applied where useful in a circuit, for example by suspending them in an epoxy paste, resin, or polymer and applying where desired. In the presence of an external magnetic field, the particles will align in the z-axis direction in the magnetic field. Such alignment can be facilitated via an electromagnet or by the use of a permanent magnet, such as in the convenient ZMAG™ magnetic pallet system available from SunRay Scientific.

[By convention the direction of the magnetic field is defined as the z-axis and thus columns will form as the particles align along the z-axis but not along the x- and y-axes. Most typically these types of particles are used to create interconnects by using conductive particles, by forming columns that conduct electricity in the desired z-axis direction without creating shorts in the x-y directions. Compositions such as anisotropic conduct adhesives (ACAs) or anisotropic conductive epoxies (ACEs) are well known.]

The inventor has discovered unexpected improvements in creating capacitors and other useful electronic components in situ by magnetically forming columns from the magnetically-alignable particles, and separating the columns with a dielectric, between opposing positively and negatively-charged aspects of the circuitry. The inventor has also discovered that capacitor-like structures (e.g. micro-capacitors) can be formed in situ with magnetically alignable nonconductive particles. These structures were not known or readily achievable prior to the instant disclosure.

The capacitors described herein have useful electrical properties but they also have valuable properties with regards to heat as they can serve to dissipate heat through the unique structure which is thermally conductive along the z-axis. They can also in certain embodiments serve in a heat sink where needed based on their ability to conduct thermally in the z-axis direction.

In a first aspect, this disclosure provides novel capacitors comprising columns of magnetically-aligned electrically conductive particles in the z-axis. The electrically conductive columns are surrounded by dielectric material that has been cured after. The alternating areas of conductive columns and non-conductive resin material are seen in FIG. 1.

In a second aspect, provided herein are capacitors (referred to herein sometimes as micro-capacitors) comprising columns formed from magnetically-alignable particles that are nonconductive. Such particles preferably comprising a ferromagnetic core, and are coated with nonconductive material, such as a metallic oxide or other nonconductive coating or treatment, preferably that can be applied to the surface of the ferromagnetic core. Each coated particle can serve as its own micro capacitor and each column of such nonconductive particles can also provide capacitance function in the z-axis direction when the ends of the columns are electrically connected to opposite charges. Because the particles are nonconductive, there is no risk of shorting if contact occurs between neighboring particles or columns, the particles can thus be included in the dielectric resin at very high concentrations relative to the first aspect of this disclosure.

In a third aspect of this disclosure, methods for making microcapacitors are provided. These capacitors can surprisingly be formed in situ through the use of materials comprising magnetically-alignable particles suspended in a curable dielectric that is a liquid, paste, gel, or semisolid (e.g. flowable, pliable, injectable or the like) prior to curing to form a solid. The dielectric is preferably an adhesive, epoxy, polymer, resin, or the like (generally referred to herein as 'dielectric resin'). The magnetically-alignable particles form columns in the z-axis direction when subjected to a magnetic field and those columns are thereafter maintained when the dielectric resin is cured, generally by application of heat or UV light, with the additional use of chemical curative agents or catalysts in certain embodiments. Thus, each conductive column is surrounded by dielectric resin and therefore electrically-isolated from adjacent column. The relative capacitance and application of the microcapacitors can be varied by altering a number of aspects including the nature of the particles (conductivity or nonconductivity, average particle size, size distribution, total mass of columns), the use of interposers, properties of the dielectric resin, pitch and/or height of the columns, and the like.

In a fourth aspect, this disclosure provides a capacitor function that is capable of storing a charge or serving as a small battery in particular applications. This aspect of the disclosure generally involves the use of nonconductive particles. Once applied, the z-axis columns are magnetically formed, and maintained as independent electrically-isolated columns via the dielectric surrounding the columns, creating a capacitor. The capacitors store energy in an electric field, establishing an electric potential (i.e. voltage). This electric potential can drive a flow of electrons or electric current which can be used to power components in a circuit. As above, it is possible to vary the capacitance or storage capabilities by vary the z-axis column density, individual particle size creating larger/denser columns and designing finer pitch circuits. FIG. 4 depicts one embodiment of such application.

The inventor has also discovered that the capacitors disclosed herein are useful for many functions in electrical and microelectrical circuitry, including applications that were heretofor impractical, unknown, or unachievable.

In yet another aspect, this disclosure provides microdevices the inventor has analogized to 'memory chips'. An exemplary embodiment is shown in FIG. 5. The "chipless memory chip" is generally an array of columns in the z-axis formed by magnetically-alignable but nonconductive coated particles. When subjected to applied power of sufficient strength, a percentage of columns in the array will become conductive as a result of the loss of the nonconductive coating on the particles that form the column. The applied power should be sufficient to exceed the non-conductive barrier in some but not all of the particles. This power surge arcs the particles, and makes a connection. The presence of columns with conductivity and columns without conductivity make each array analogous to a simple memory chip, i.e. the array of columns is like an array of 0s and 1s. The pattern of conductive and nonconductive columns in the array can be read. Because each array is different unique, the array is useful for a variety of purposes including such things as smart paper, identification, or the like.

In still further aspects, this disclosure provides methods for creating capacitors, micro-capacitors or chipless memory chips. The methods generally comprise the steps of:

a) providing a source of magnetically-alignable particles in a curable resin or epoxy material;
b) applying the material to a desired location;
c) applying a magnetic field in the z-axis direction and aligning the particles by forming columns in the z-axis, and
d) curing the material;

wherein if the particles are electrically conductive, the columns are formed predominantly between opposing magnetic interposers; conductive columns are formed on a single layer circuit having negative and positive circuits side by side; and wherein if the particles are electrically nonconductive they can provide capacitance in the z-axis when the opposite ends of the formed columns are electrically in contact with opposite charges.

These and/or further aspects, features, and advantages of the present invention will become apparent to those skilled in the art in view of this disclosure.

BRIEF DESCRIPTION OF THE DRAWINGS

FIG. 3 depicts an illustration of a cross section of an embodiment of a capacitor comprising magnetically-alignable particles comprising conductive ferromagnetic cores with nonconductive (dielectric) coating aligned into columns along the z-axis before curing. The application of a magnetic field prior to curing creates the vertical columns of the non-conductive particles between the opposing pads along the whole bond. The alternating layers of conductive particle cores and the nonconductive coating provides capacitance properties along the z-axis FIG. 4 depicts an embodiment using nonconductive ferromagnetic particles (e.g. coated with a nonconductive layer) magnetically aligned into z-axis connecting opposing negative and positive charged circuits. This arrangement creates a capacitor between the opposing pads.

FIG. 5 depicts an embodiment of a 'chipless memory chip' showing an array of columns formed with magnetically alignable particles coated with nonconductive oxidizable material that can be 'burned off' when subjected to a sufficiently high pulse of power (e.g. a 'flash'). The resultant array features a unique pattern of conductive and nonconductive columns (i.e. 0s and 1s) that can be read and form, e.g., a unique identifier that can be useful for various applications including security applications, smart paper, and the like.

DETAILED DESCRIPTION

Figure 1:
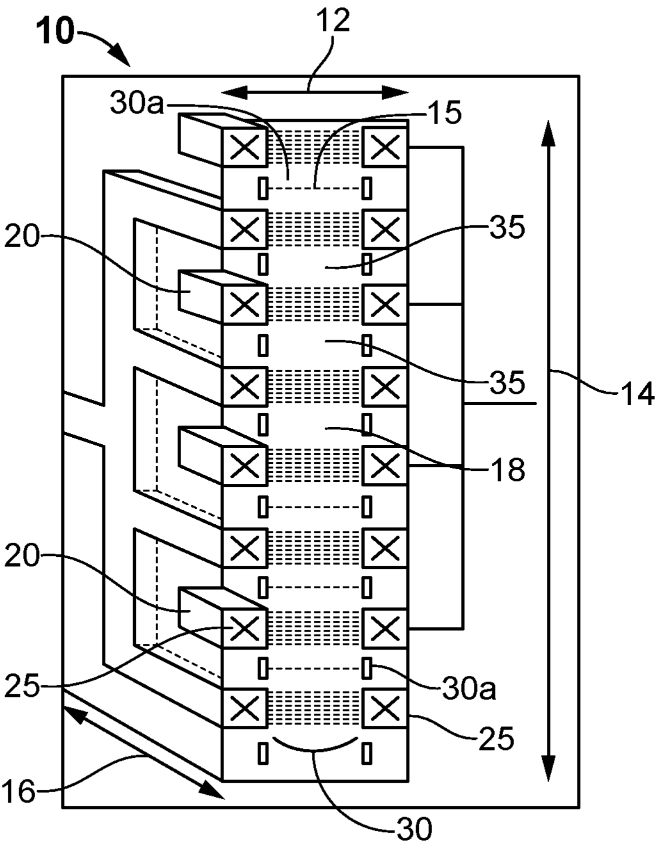
FIG. 1. depicts an embodiment of a capacitor comprising columns of magnetically-aligned conductive particles formed between opposing magnetic interposers and opposite charged traces wherein the dielectric comprises e.g. a cured resin or epoxy.

Provided herein are methods and compositions that provide the ability to create useful capacitors in situ using magnetically-alignable particles.

Definitions & Abbreviations

Unless expressly defined otherwise, all technical and scientific terms, terms of art, and acronyms used herein have the meanings commonly understood by one of ordinary skill in the art in the field(s) of the invention, or in the field(s) where the term is used. In accordance with this description, the following abbreviations and definitions apply.

Abbreviations

The following abbreviations apply unless indicated otherwise:

ACA: anisotropic conductive adhesive;
ACE: anisotropic conductive epoxy;
F: farad;
μF: microfarad (one millionth farad); and
pF: picofarad (one trillionth farad).

DEFINITIONS

As used herein "substantially" may mean an amount that is larger or smaller than a reference item. Preferably substantially larger (or greater) or smaller (or lesser) means by at least about 10% to about 100% or more than the corresponding reference item. More preferably "substantially" in such instances means at least about 20% to about 100%, or more, larger or smaller than the reference item. As the skilled artisan will appreciate the term 'substantially' can also be used as in "substantially all" which mean more than 51%, preferably more than 60%, 67%, 70%, 75%, 80%, 85%, 90%, or more of a referenced item, number, or amount. "Substantially all" can also mean more then 90% including 91, 92, 93, 94, 95, 96, 97, 98, 99 or more percent of the referenced item, number, or amount.

As used herein, the singular form of a word includes the plural, and vice versa, unless the context clearly dictates otherwise. Thus, the references "a", "an", and "the" are generally inclusive of the plurals of the respective terms. For example, reference to "an electrode" or "a diode" includes a plurality of such "electrodes" or "diodes".

The words "comprise", "comprises", and "comprising" are to be interpreted inclusively rather than exclusively. Likewise the terms "include", "including" and "or" should all be construed to be inclusive, unless such a construction is clearly prohibited from the context. Further, forms of the terms "comprising" or "including" are intended to include embodiments encompassed by the phrases "consisting essentially of" and "consisting of". Similarly, the phrase "consisting essentially of" is intended to include embodiments encompassed by the phrase "consisting of".

Where used herein, ranges are provided in shorthand, so as to avoid having to list and describe each and every value within the range. Any appropriate value within the range can be selected, where appropriate, as the upper value, lower value, or the terminus of the range.

The formulations, compositions, methods and/or other advances disclosed here are not limited to particular methodology, protocols, and/or components described herein because, as the skilled artisan will appreciate, they may vary. Further, the terminology used herein is for the purpose of describing particular embodiments only, and is not intended to, and does not, limit the scope of that which is disclosed or claimed.

Although any formulations, compositions, methods, or other means or materials similar or equivalent to those described herein can be used in the practice of the present invention, the preferred formulations, compositions, methods, or other means or materials are described herein.

Any references, including any patents, patent applications, or other publications, technical and/or scholarly articles cited or referred to herein are in their entirety incorporated herein by reference to the extent permitted under applicable law. Any discussion of those references is intended merely to summarize the assertions made therein. No admission is made that any such patents, patent applications, publications or references are prior art, or that any portion thereof is either relevant or material to the patentability of what is claimed herein. Applicant specifically reserves the right to challenge the accuracy and pertinence of any assertion that such patents, patent applications, publications, and other references are prior art, or are relevant, and/or material.

As used herein, "alignment" means aligning a magnetic material or composition comprising magnetic particles. Generally, aligning refers to the arrangement of magnetic particles in the z-axis under the influence of a magnetic field. Alignment is the process by which columns are formed in the z-axis.

As used herein, "columns" refers to the structures formed by magnetic particles in a composition in the z-axis under the influence of a magnetic field. The process of column formation is sometimes referred to as 'alignment'. The column properties (e.g. height, diameter, etc.) will be determined by the strength of the magnets and the properties of the dielectric resin, epoxy, or polymer including the size and amount of the magnetic particles in the mixture, and the viscosity and other physical properties of the mixture. Columns can and will form within seconds of exposure to a suitable magnetic field.

A "magnet" is capable of producing a "magnetic field" which as used herein includes any magnetic field whether produced by an electromagnet or a permanent magnet. The "strength" of a magnet can be measured in Gs (or Ts).

As used herein, a "permanent magnet" means a magnet that does not require electrical current to flow in order to have a persistent magnetic field. Permanent magnets for use herein can comprise iron, nickel, cobalt, and rare earth metals. Certain presently preferred embodiments herein utilize rare earth magnets such as those comprising lanthanoid elements. Magnets comprising neodymium, or salts thereof, may be useful herein because of their magnetic strength. In one embodiment, the magnets comprise neodymium, iron, and boron ("NIB magnets"). Samarium, gadolinium, and even dysprosium, and salts thereof may be used for specific applications. Other types of permanent magnets such as ceramic magnets and other composite magnets, and even flexible magnets may be suitable for use herein for other specific applications.

As used herein, an "interconnect" is generally a connection between any two aspects of a system. Interconnect herein generally reflects an electrical connection and a physical connection between e.g. two component or a component and a substrate. "Substrate" is any material used to hold or contain and other electronic components connected thereon for use in an electronic system or device, such as a printed circuit board ('PCB'). Substrates can be flexible or rigid. Preferred rigid substrates include e.g. PCBs, composites, and rigid polymers, and preferred flexible supports include e.g., flexible polymers.

As used herein, "parallel" means that two lines, such as lines representing magnetic flux are always the same distance apart and never touch each other and exist in the same plane, i.e. they are at 0 degrees with respect to each other. Parallel lines herein are generally reference magnetic flux lines in the Z-axis, which are generally perpendicular (i.e. 90 degrees) to the X-Y plane of the substrate. Because of the difficulty of having perfectly parallel flux lines throughout entire applications involving multiple magnets, parallel lines in various embodiments herein may include lines that are "substantially parallel" to each other and/or substantially perpendicular to the X-Y. Such lines may be positioned at e.g. about −30 to about 30 degrees with respect to each other, and/or at about 60 to about 120 degrees with respect to the Z-Y plane. More preferably such lines are positioned at e.g. about −15 to about 15 degrees with respect to each other, and/or about 75 to about 105 degrees with respect to the Z-Y plane. Still more preferably substantially parallel flux lines are positioned at e.g. about −5 to about 5 degrees with respect to each, and/or about 85 to about 95 degrees with respect to the X-Y plane of the substrate. Even more preferably the substantially parallel lines will be positioned within about 0 to about 2 degrees of each other or within about 0 to about 2 degrees of perpendicular to the X-Y plane. The skilled artisan will appreciate that the more the magnetic flux lines approximate parallel to each other and perpendicular to the X-Y plane, the more the ACA will form parallel columns during the alignment which will be the basis of the interconnect, and the less shorts and other defects will be present.

As used herein, "z-axis" means the direction that is perpendicular to the main plane in which the substrate lies, i.e. the X-Y plane.

DETAILED DESCRIPTION OF ILLUSTRATIVE EMBODIMENTS

In a first aspect this disclosure is directed to methods of creating a functional capacitor in situ using magnetically-alignable conductive adhesive or epoxy, and the capacitors or capacitor-like structures that are formed.

Materials or compositions comprising magnetically-alignable conductive particles in a dielectric curable base are applied where capacitance is desired. In certain embodiments the materials or compositions can be an anisotropic conductive adhesive (ACA) or anisotropic conductive epoxy (ACE). The material comprising the particles is applied as a viscous liquid or semi-solid material, e.g. as a paste, gel or the like. Ideally the material is applied with viscosity such that the magnetic particles which form part of the composition can quickly migrate to form z-axis structures/columns. In preferred embodiments, the particles can align and the columns can form within seconds of exposure to the magnetic field. The viscosity is preferably thick enough to allow application in the location and in the amount desired.

The material is then cured, preferably without pressure, either with heat (preferably at temperature in the range from about 40 C to about 200 C), UV, or hybrid UV/heat cure. Generally the curing is done or at least initiated in the presence of the magnetic field. Preferably the magnetic field is applied so as to maximize proper column formation in the z-axis without concomitant structures in the x-y plane which can create undesired connections/shorts. The foregoing process results in the self-assembly of conductive z-axis columns at regular intervals throughout the thickness of the adhesive layer.

The columns of the conductive magnetic particles create electrical (and thermal) connections along the z-axis. The resin, adhesive, or epoxy bulk phase generally has dielectric properties which maintain electrical insulation in the x-y plane. After formation, the columns maintain their structure due to immobilization within the cured, (i.e. now rigid) resin or polymer matrix. Using the application of the magnetic field, a capacitor can be functionally-created between opposing negative and positive-charged vertical columns. The magnetically-alignable particles in some embodiments act as individual magnetic interposers that other particles follow along the z-axis flux lines created by the magnetic field.

By modifying the opposing pads with a ferromagnetic material the particles will not only form in the z-axis but exhibit a tendency to migrate towards the magnetic pads on the circuit. This will produce a higher relative concentration of the ferromagnetic particles, and thus columns at the pad sites, congregated from the bottom pad. This creates a sufficient dielectric void between the negatively charged columns and the positive charged columns creating a capacitor. Because the particles are largely in columns along the z-axis, rather than creating connection (i.e. shorts) in the x-y plane, capacitance can build without completing an electrical connection.

The negatively-charged columns are electrically isolated from adjacent positively-charged columns thus creating a functional capacitor from the magnetically-aligned conductive adhesive. Capacitance properties are created between the opposing negative and positive charged columns in the circuit.

The novel capacitors thus comprise columns of magnetically-aligned electrically conductive particles in the z-axis. The electrically conductive columns are surrounded by dielectric material that has been cured after. The alternating sections of conductive columns and non-conductive resin material can be seen in FIG. 1.

With reference to FIG. 1, columns 30 are formed as particles 15 align along the z-axis 12, but not along the x- or y-axes (14 and 16 respectively) when a magnetic field is applied. The columns are surrounded by dielectric resin 18, which is cured after the columns 30 are formed. To maximize formation of columns 30 and column density where desired, one or more magnetic interposers 20 comprising ferromagnetic material such as nickel (e.g. nickel pads 25, or other nickel-coated material), can be placed where column 30 formation is desired. The presence of the (relative) mass of ferromagnetic material in the interposers 20 draws the columns 30 towards the interposer(s) 20 when the magnetic field is applied during the magnetic alignment process, where the columns 30 remain once the resin 18 (e.g. polymer or epoxy material or the like) is cured. The relative concentration (columns per unit area) of z-axis columns 30 in the vicinity of the interposers 20 can be seen in FIG. 1 as the columns 30 are clustered in regions 35, but there may still be some other columns 30*a* that form more distal to the interposers 20 and not present in regions 35.

The view shown in FIG. 1 also shows the positive and negative traces (50, 60) in partial view. As can be seen, the alternating regions 35 are in electrical contact with opposite electrically-charges, i.e. each column 30 in a region 35 is in contact with an electric charge, and each column 30 in any adjacent region 35 is in contact with the opposing electric charge. The regions 35 are electrically isolated from adjacent regions 35 by the presence of the dielectric resin 18 that surrounds each column 30 and is located between regions 35. Thus a capacitor is formed with the columns being electrically-conductive in the direction of the z-axis but electrically isolated and possess capacitance in the direction of the x- and/or y-axes. The amount of capacitance can be varied, for example by varying the mass (e.g. number of columns, size of the particles, and/or the height of the columns), the number of alternating regions and the distance between them, and/or the dielectric properties of the dielectric resin.

The capacitors described herein can also be formed in electronic interconnect pads that do not include any magnetic interposers, however in the absence of the draw of the magnetic interposers, the formation of columns in such embodiments will be randomly spaced throughout the bond line/area (i.e. throughout the cured adhesive, epoxy, or polymer).

Figure 2:
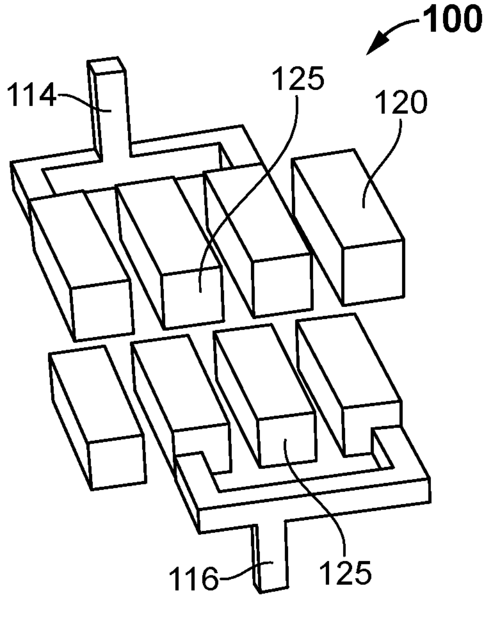
FIG. 2. depicts an embodiment of circuitry designed to allow a capacitor to form (in accordance with one aspect of this disclosure) including magnetic interposers, opposite charged traces with passivated gold or gold cladding.

Thus, with reference to FIG. 2, interposer 120 will produces a higher concentration of z-axis columns (not shown) in the areas nearest the ferromagnetic interposer pads 125. The positive and negative charged traces, 114 and 116 respectively, can be seen in each of FIGS. 1 and 2. As the skilled artisan will appreciate, the columns formed in this manner can be electrically conductive in the z-axis direction but not in the x-y direction where there are alternating regions of positively and negatively charged conductive materials separated by areas of nonconductive/dielectric material (e.g. cured resin/epoxy). This unique arrangement provides useful capacitance properties along the x- and y-axes.

Thus, the skilled artisan will appreciate that using optional ferromagnetic interposers with this aspect of the disclosure can provide additional power handling capability. Drawing the columns during formation to the vicinity of the interposers results in clustering of the columns such that an increased percentage of the conductive columns are on the pads and in electrical contact therewith. This provides lower contact resistance and increased power capability in the capacitors formed in situ.

The capacitance of the capacitors created in this aspect of the disclosure can vary. In one embodiment, the capacitance is on the order of about 1 pF/mm$^2$ or greater. In another embodiments the capacitance is about 1 nanoF/mm$^2$ or greater. In still other embodiments, the capacitance ranges from about 1 pF/mm$^2$ to about 1 nanoF/mm$^2$ to about 1 μF/mm$^2$ or greater. The skilled artisan will appreciate the variety of ways in which the capacitance of such a capacitor can be manipulated for a wide variety of applications.

In one embodiment, capacitors comprising a plurality of discrete columns of electrically-conductive, magnetically-alignable particles are provided. The particles are magnetically-aligned in a z-axis direction, and electrically isolated along the x- and y-axes. Preferably, the plurality of columns are grouped into a plurality of regions, each region having an electrical charge such that each of the plurality of regions of electrically-conductive columns has the opposite electrical charge as each region directly adjacent to it. In preferred embodiments, each column and each region are separated and electrically isolated from each column and each region directly adjacent thereto by a cured dielectric resin surrounding each of the plurality of columns.

In one embodiment, the capacitor is formed in situ in an integrated circuit or electronic component 10.

The capacitor can optionally further comprise one or more ferromagnetic interposers in various embodiments. The columns are preferably more densely packed in the vicinity of the interposers in such embodiments.

The dielectric resin in various embodiments is a thermally or UV curable epoxy or other polymer. The magnetically-alignable particles preferably are smaller than about 300 microns. In various presently preferred embodiments, they may be on the scale of nanometer to microns. In one embodiment the average particle size is between about 10 nanometers and 200 microns in diameter. In another, the particles average between about 20 nanometers and 100 microns. Average particle sizes of about 10, 20, 30, 40, or 50 nanometers can be useful herein, as well as average particle sizes of about 60, 70, 80, 90, or even 100 nanometers. In yet other embodiments, particles may be about 100 microns or less on average, about 50 microns or less, about 20 microns or less, or about 10 microns or less.

In a second aspect of the disclosure, capacitors (referred to herein sometimes as micro-capacitors) comprising columns are formed from magnetically-alignable particles that are nonconductive. Such particles preferably comprising a ferromagnetic core, and are coated with nonconductive material, such as a metallic oxide or other nonconductive coating or treatment, preferably that can be applied to the surface of the ferromagnetic core. Each individual coated particle can serve as its own micro capacitor and each column of such nonconductive particles can also provide capacitance function in the z-axis direction when the ends of the columns are electrically connected to opposite charges.

The material or composition comprising the nonconductive particles is applied as above (e.g., as a paste, gel, or viscous composition, with only minimal or no external pressure) and cured as above (at temperatures preferably between about 70 C to 200 C, or with UV light) preferably in the magnetic field. This results in the self-assembly of columns of nonconductive at regular intervals throughout the adhesive thickness.

Among the differences between this aspect and the first aspect of this disclosure is that this second aspect employs magnetically-alignable but nonconductive particles. The particles are very similar to those suitable for use in an ACE or ACA, but by virtue of being oxidized or coated with nonconductive (such as nickel oxide, or other nonconductive materials), the particles are not conductive in contrast with the conductive particles in ACA or ACE compositions. These particles will also create capacitance in the direction of the z-axis, unlike in the first aspect where capacitance lies solely in the x- and y-directions. In the z-direction, for this aspect, the nonconductive coating serves as the dielectric between the conductive ferromagnetic cores of the particles, whereas in the directions of the x- and y-axes, the cured resin serves as the dielectric surrounding each column.

Like their conductive counterparts, the nonconductive coated ferromagnetic particles when subjected to a magnetic field result in the formation of vertical columns along the z-axis due to their ferromagnetic core.

Because the particles are not conductive but instead coated with a nonconductive film, coating, or the like (such as an oxide), each can act as its own microcapacitor with thin layers of capacitance between the opposing negative and positive pads in the circuit. The columns of these particles thus create a z-axis chain of capacitors.

The skilled artisan will appreciate that the capacitance values can be altered or adjusted in a number ways, including by varying the circuit design, the height of the bond line (i.e. the height of the z-axis), use of different size particles, altering the ferromagnetic density, or changing the amount of particles in the dielectric epoxy resin. Unlike in the first aspect where too many particles can lead to shorts between adjacent columns in the x- and y-directions, inclusion of larger amounts of particles can be maintained in this aspect with no concerns about shorting due to the fact that particles are not conductive.

The dielectric constant will be increased or decreased with the particle density loading and the z-axis column formation controlled during the cure by the intensity of an induced magnetic field. The desired capacitance is set by both applying a magnetic field and heat to cure them in place. Once the magnetic field is in place and the ferromagnetic columns are formed the cured epoxy holds in place the created non-conductive columns and no columns of individual capacitors.

There advantages to a magnetically aligned nonconductive magnetically-alignable material including:

(1) desired capacitance value can be created within the bond line of application;

(2) ability to make the ranges of the dielectric constant variable with particle loading, height of the individual particles, particle size and thickness of the oxides or non-conductive coating on the particles, and (3) by adjusting the percent loading in the z-axis the ability to create a storage of power can be made.

Figures 3, 4, 5:
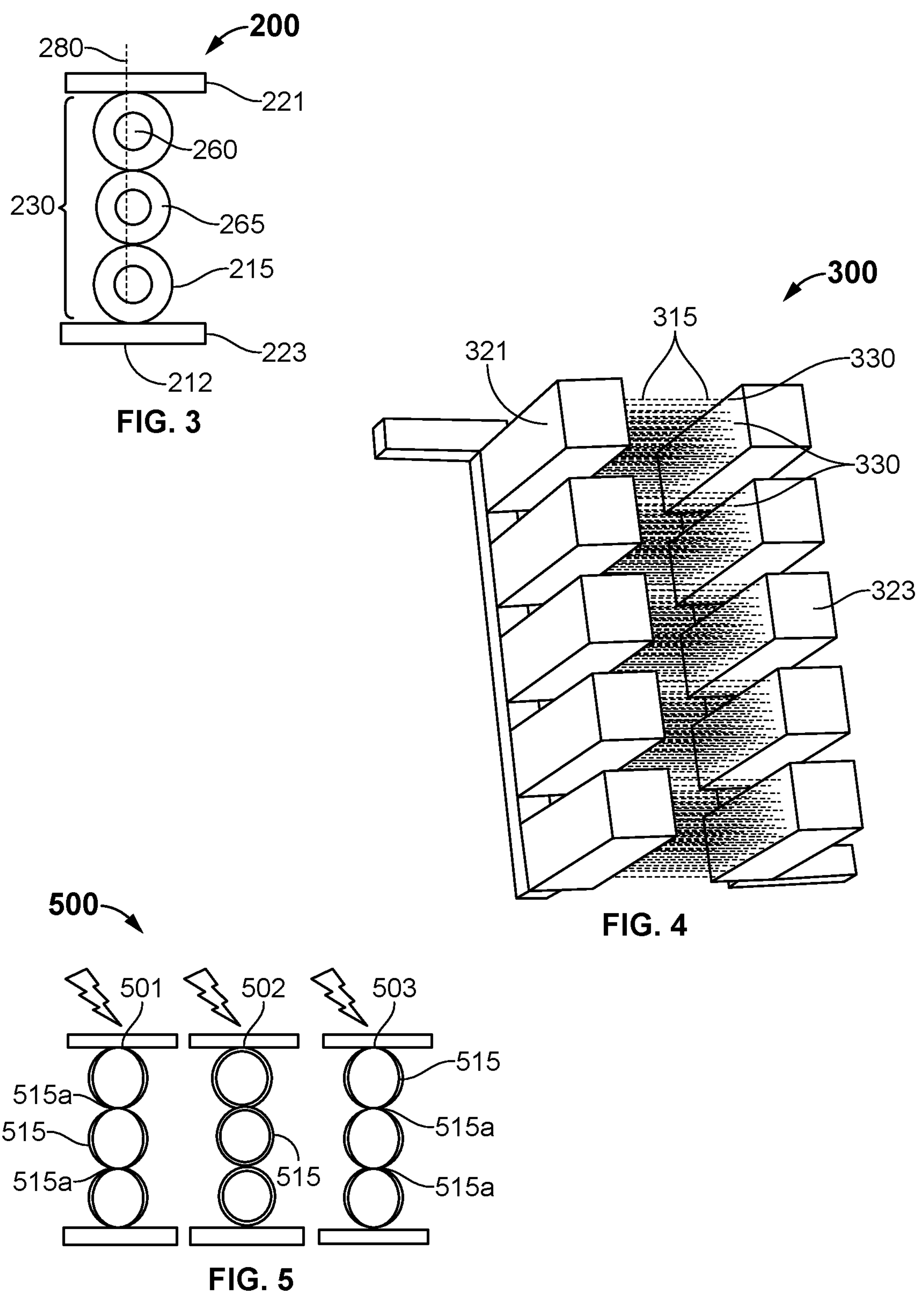

The use of nonconductive ferromagnetic particles in this second aspect of the disclosure can be better understood with reference to FIG. 3. As can be seen a column 230 or nonconductive particles 215 have aligned after exposure to a magnetic field line 280 applied to the z-axis 212. The columns 230 are formed between positive and negative contact pads 221, 223. Each nonconductive particle features a ferromagnetic core 260 and a nonconductive coating 265. The skilled artisan will appreciate that the capacitor thus formed has capacitance along the z-axis 212 between positive and negative pads 221, 223.

In one embodiment hereof, capacitors that comprise a plurality of discrete columns of magnetically-alignable, electrically-nonconductive particles which are magnetically-aligned in a z-axis direction are provided. Preferably, the columns are positioned between and in electrical connection with contacts points having opposing electrical charges. Also preferably each of the plurality of nonconductive columns has positive electrical charge at one end and a negative charge at the other end. In general, the plurality of nonconductive columns is surrounded by a bulk phase of cured dielectric resin.

In one embodiment, the electrically-nonconductive particles comprise a ferromagnetic core, with sufficient amounts of a nonconductive coating to ensure the particle are nonconductive. Preferably the nonconductive coating comprises a nonconductive oxide coating, such as a metal oxide, in sufficient amount to eliminate the conductivity of the particles' ferromagnetic cores.

In one presently preferred embodiment, the capacitors are formed in situ, for example in an integrated circuit or electronic component.

In one embodiment of this aspect of the present disclosure, the capacitor holds a charge and functions as a battery, for a variety of small-scale and large scale uses. An embodiment of such application is depicted in FIG. 4. Battery 300 is shown with a plurality of columns 330 each comprising magnetically-aligned nonconductive particles 315. As can be seen, the opposite ends of columns 330 are in electrical contact with positively- or negatively-charged contact pads 321, 323. This configuration allows battery 300 to store a charge between the pads 321,323 which can be used for a variety of applications, including powering up a system, short-term emergency power, and the like. In preferred embodiments, these batteries can be designed to charge quickly and discharge slowly. Applications in hybrid vehicles, alternative energy storage, and back-up power are contemplated for use herein. Use in applications where lightweight or small size are a consideration are also contemplated considering the present batteries can be very small.

The dielectric resin in various embodiments is a thermally or UV curable epoxy or other polymer. The magnetically-alignable particles preferably are smaller than about 300 microns. In various presently preferred embodiments, they may be on the scale of nanometer to microns. In one embodiment the average particle size is between about 10 nanometers and 200 microns in diameter. In another, the particles average between about 20 nanometers and 100 microns. Average particle sizes of about 10, 20, 30, 40, or 50 nanometers can be useful herein, as well as average particle sizes of about 60, 70, 80, 90, or even 100 nanometers. In yet other embodiments, particles may be about 100 microns or less on average, about 50 microns or less, about 20 microns or less, or about 10 microns or less.

The capacitance of the capacitors created in this aspect of the disclosure can vary. In one embodiment, the capacitance is on the order of about 1 pF/mm$^2$ or greater. In another embodiments the capacitance is about 1 nanoF/mm$^2$ or greater. In still other embodiments, the capacitance ranges from about 1 pF/mm$^2$ to about 1 nanoF/mm$^2$ to about 1 μF/mm$^2$ or greater. The skilled artisan will appreciate the variety of ways in which the capacitance of such a capacitor can be manipulated for a wide variety of applications.

The capacitance of the capacitor can be adjusted by altering (i) a ratio of nonconductive particles to dielectric resin; (ii) a height/depth of nonconductive particles and resin along a bond line where the capacitor is formed; (iii) an average size or distribution of the nonconductive particles; (iv) altering the nature or properties of a nonconductive coating on the particles; (v) the dielectric constant of the dielectric resin; or (vi) any combination of (i)-(v).

In another aspect of the disclosure, methods of generating a capacitor in situ in an integrated circuit or electronic component are provided. The methods comprise the steps of providing a composition comprising at least magnetically alignable particles suspended in a curable dielectric resin; applying the composition to a bond line in an integrated circuit or electronic component; subjecting the composition to a magnetic field along a z-axis to allow the magnetically-alignable particles to form columns the direction of/along the z-axis; and curing the dielectric resin to maintain the columns so formed. The magnetically-alignable particles preferably have a ferromagnetic core.

If the magnetically-alignable particles are electrically-nonconductive, the columns are generally in electrical contact at one end with a negative electrical charge and in electrical contact at the other end with a positive electrical charge, such on contact pads or the like of the circuit or electronic component, thereby forming a capacitor having capacitance along the z-axis.

If the magnetically-alignable particles are electrically-conductive, the columns are formed into regions separated by dielectric resin and electrically connected such that the conductive particles in each column in one region are connected to the opposite charge as the conductive particles in each column in an adjacent region, thereby forming a capacitor having conductivity along the z-axis and capacitance along the x- and y-axes.

In a presently preferred embodiment, the magnetic field is applied via a permanent magnet. the magnetically-alignable particles are nonconductive and have a nonconductive surface coating that comprises a nonconductive oxide.

In one embodiment of the method, the particles are electrically conductive and the columns of magnetically-alignable particles are magnetically drawn to form in the vicinity of a magnetic interposer present in the integrated circuit or electronic component.

In a further aspect of the invention, the use of the nonconductive oxide coated particles can create not only the ability to make a z-axis column for capacitance but a way to make a 'memory' application. Because the z-axis connections are made to the opposing circuit pads and they are connected but non conductive because of the oxides, it is possible to put a current through the z-axis columns that can burn through the oxides creating random shorts/connection.

This process creates unique, varied patterns of connections—somewhat analogous to a memory chip. In specific embodiments, an array of columns formed with magnetically alignable particles are coated with nonconductive oxidizable material that can be 'burned off' or flashed. When the particles are subjected to a sufficiently high pulse of power, the coating can be lost and connections made. The resultant array features a unique pattern of conductive and nonconductive columns (i.e. 0s and 1s) that can be read and form, e.g., a unique identifier that can be useful for various applications. Examples of how this technology can be employed includes security applications, smart paper, identification, authentication, and the like where the unique properties of the array can be used to verify the source.

With further reference to the figures, FIG. 5 shows a partial view of an embodiment of an array according to this aspect of the disclosure. As can be seen, the partial array shows three columns 501, 502, 503 each comprising a plurality of nonconductive particles 515 that have been briefly subjected to a high voltage. Columns 501 and 503 have each developed electrical connections between the particles 515 that have lost the nonconductive coating sufficiently to allow conductivity through the column. Column 502 remains nonconductive as the particles 515 therein have retained sufficient coating to prevent electrical connectivity therebetween. The skilled artisan will appreciate that an actual array would include many rows each of which would include many columns, and each array would not only be unique for its distribution of rows and columns therein, but also for the pattern of conductive and nonconductive columns in the array after the burst of voltage is applied.

Figure 6:
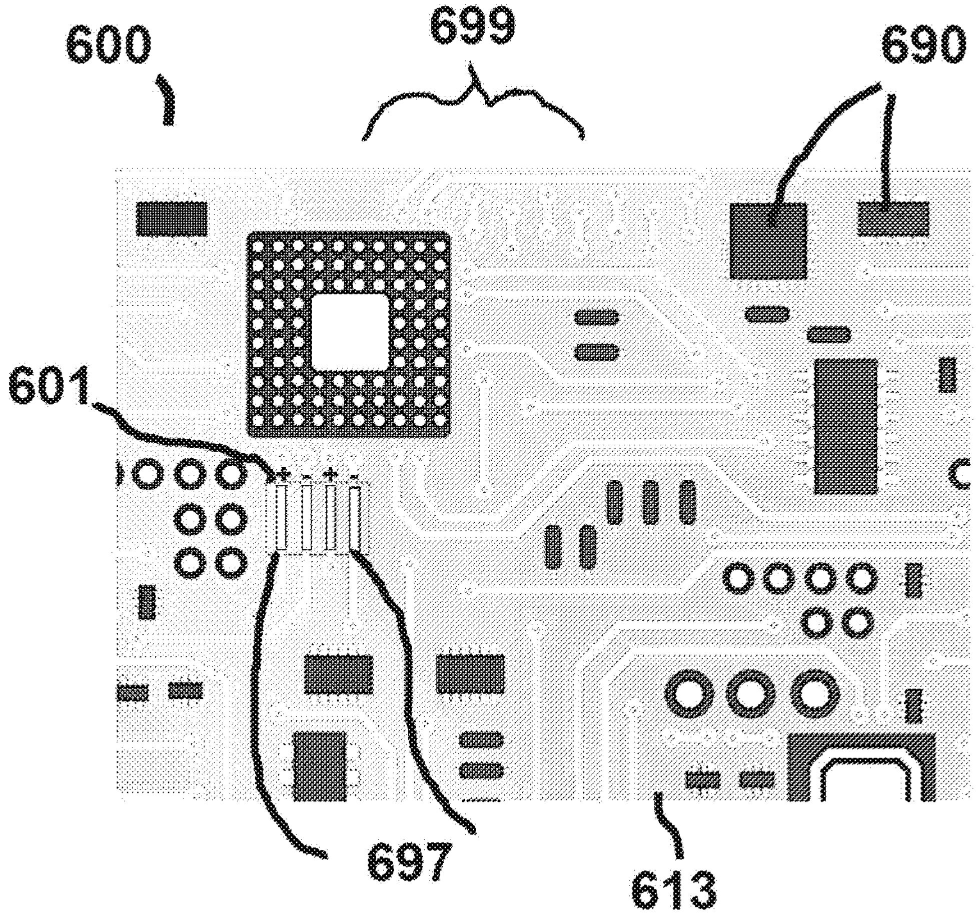
FIG. 6 shows a capacitor formed using magnetically-alignable particles in situ in an integrated circuit.

With further reference to the figures, FIG. 6 shows a partial view of an embodiment 600 of an integrated circuit 699 adapted for a capacitor to be formed in situ at capacitor area 601 according to the disclosure. As can be seen, during manufacture, the substrate 613 of the integrated circuit 699 may comprise a plurality of electronic components 690 that require interconnection. The capacitor can be formed in situ at the same time by applying, e.g. an ACE or ACA comprising the magnetically-alignable conductive particles in a curable dielectric resin to the capacitor 'area' denoted with the thin black border. Upon application of a magnetic field along the z-axis of the integrated circuit 699 to interconnect the electronic components 690 to the substrate 613, the particles (not shown) form columns (not shown), which form densely-packed regions (not shown) of columns in the vicinity of the optional ferromagnetic interposers 697. Upon curing of the resin, the electronic components 690 are interconnected to the integrated circuit 699 and the capacitor area 601 features regions of the electrically-conductive columns comprising the magnetically-alignable particles separated by the cured dielectric thereby forming the capacitor in situ on the integrated circuit.

The scope of the invention is set forth in the claims appended hereto, subject, for example, to the limits of language. Although specific terms are employed to describe the invention, those terms are used in a generic and descriptive sense and not for purposes of limitation. Moreover, while certain presently preferred embodiments of the claimed invention have been described herein, those skilled in the art will appreciate that such embodiments are provided by way of example only. In view of the teachings provided herein, certain variations, modifications, and substitutions will occur to those skilled in the art. It is therefore to be understood that the invention may be practiced otherwise than as specifically described, and such ways of practicing the invention are either within the scope of the claims, or equivalent to that which is claimed, and do not depart from the scope and spirit of the invention as claimed.

What is claimed is:

1. A capacitor comprising:

a plurality of discrete columns of electrically-conductive, magnetically-alignable particles which are magnetically-aligned in a z-axis direction, and electrically isolated along the x- and y-axes;

a plurality of placed ferromagnetic interposers; and a dielectric resin;

wherein the plurality of placed ferromagnetic interposers magnetically form concentrated clusters of the plurality of columns into one or more densely-packed, patterned regions of the capacitor that substantially corresponds to the vicinity area of ferromagnetic interposers of the plurality of ferromagnetic interposers, each such region configured to provide an electrical charge such that each region of electrically-conductive columns provides the opposite electrical charge as each region directly adjacent thereto, wherein each column and each region is separated and electrically isolated from each column and each region directly adjacent thereto by a cured dielectric resin surrounding each of the plurality of columns;

wherein the dielectric resin is cured after the columns are magnetically aligned in the z-axis direction.

2. The capacitor of claim 1 that is formed in situ in an integrated circuit or electronic component.

3. The capacitor of claim 1 wherein the dielectric resin is a thermally or UV curable epoxy or other polymer.

4. The capacitor of claim 1 wherein the magnetically-alignable particles average between about 10 nanometers and 200 microns in diameter.

5. The capacitor of claim 1 wherein the magnetically-alignable particles average between about 20 nanometers and 100 microns in diameter.

6. The capacitor of claim 1 having a capacitance of about 0.1 pF or greater per square millimeter.

* * * * *